(12) United States Patent
Morioka et al.

(10) Patent No.: US 9,110,256 B2
(45) Date of Patent: Aug. 18, 2015

(54) LENS ARRAY AND MANUFACTURING METHOD THEREOF

(71) Applicant: ENPLAS CORPORATION, Kawaguchi-shi, Saitama (JP)

(72) Inventors: Shimpei Morioka, Kawaguchi (JP); Kazutaka Shibuya, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/352,976

(22) PCT Filed: Oct. 24, 2012

(86) PCT No.: PCT/JP2012/077475
§ 371 (c)(1),
(2) Date: Apr. 18, 2014

(87) PCT Pub. No.: WO2013/062004
PCT Pub. Date: May 2, 2013

(65) Prior Publication Data
US 2014/0270662 A1    Sep. 18, 2014

(30) Foreign Application Priority Data

Oct. 25, 2011  (JP) ................................. 2011-233757

(51) Int. Cl.
*G02B 6/36* (2006.01)
*G02B 6/42* (2006.01)

(52) U.S. Cl.
CPC ............ *G02B 6/4204* (2013.01); *G02B 6/4214* (2013.01); *G02B 6/4249* (2013.01); *G02B 6/4292* (2013.01)

(58) Field of Classification Search
CPC .. G02B 6/4292; G02B 6/4204; G02B 6/4246; G02B 6/36
USPC .................................... 385/53, 88, 92, 93, 94
See application file for complete search history.

(56) References Cited

U.S. PATENT DOCUMENTS

| 5,500,523 A * | 3/1996 | Hamanaka .................... 250/216 |
| 6,328,485 B1 | 12/2001 | Hotta |
| 8,787,714 B2 * | 7/2014 | Morioka ........................ 385/33 |
| 2006/0002651 A1 | 1/2006 | Shimizu et al. |
| 2007/0104416 A1 | 5/2007 | Shimizu et al. |
| 2012/0263416 A1 | 10/2012 | Morioka |

FOREIGN PATENT DOCUMENTS

| JP | H02-281211 A | 11/1990 |
| JP | 2001-356246 A | 12/2001 |

(Continued)

OTHER PUBLICATIONS

International Search Report (ISR), mailed Dec. 11, 2012, issued for International Application No. PCT/JP2012/077475.

*Primary Examiner* — Jennifer Doan
(74) *Attorney, Agent, or Firm* — Law Office of Katsuhiro Arai (57) ABSTRACT

A lens array is provided with a prism adhered within a prism placement recessing section by an adhesive, wherein retention of air-bubbles in the adhesive on an optical path of light of each light-emitting element between the prism placement recessing section and the prism is prevented by a first air-bubble retention prevention recessing section and a second air-bubble retention prevention recessing section that communicate with the prism placement recessing section in a lens array direction, and flowing of the adhesive onto a total reflection surface is prevented by an adhesive flow prevention recessing edge section.

4 Claims, 7 Drawing Sheets

(56) References Cited

FOREIGN PATENT DOCUMENTS

| | | | |
|---|---|---|---|
| JP | 2006-017885 A | 1/2006 |
| JP | 2007-296111 A | 11/2007 |
| JP | 2011-033659 A | 2/2011 |
| JP | 2011-133807 A | 7/2011 |
| WO | 2011/077723 A1 | 6/2011 |

* cited by examiner

LENS ARRAY AND MANUFACTURING METHOD THEREOF

This application is the U.S. National Phase under 35 U.S.C. §371 of International Application PCT/JP2012/077475, filed Oct. 24, 2012, which claims priority to Japanese Patent Application No. 2011-233757, filed Oct. 25, 2011. The International Application was published under PCT Article 21(2) in a language other than English.

TECHNICAL FIELD

The present invention relates to a lens array and a method for manufacturing the lens array. In particular, the present invention relates to a lens array suitable for optically coupling a plurality of light-emitting elements and end faces of an optical transmission body, and a method for manufacturing the lens array.

BACKGROUND ART

In recent years, the application of so-called optical interconnection has become wide-spread as a technology for transmitting signals at high speed within a system device, between devices, or between optical modules. Here, optical interconnection refers to a technology in which optical components are handled as if they are electronic components, and are mounted on motherboards, circuit boards, and the like used in personal computers, vehicles, optical transceivers, and the like.

An optical module used in optical interconnection such as this serves various purposes, such as internal connection for media converters and switching hubs, and in-device and inter-device component connection for optical transceivers, medical equipment, testing devices, video systems, high-speed computer clusters, and the like.

As an optical component applied to this type of optical module, there is an increasing demand for a lens array in which a plurality of lenses having a small diameter are disposed in an array, as a compactly structured component effective for actualizing multichannel optical communication.

Here, the lens array is conventionally configured such that a photoelectric conversion device including a plurality of light-emitting elements (such as a vertical cavity surface emitting laser [VCSEL]) can be attached thereto, and a plurality of optical fibers serving as an optical transmission body can be attached thereto.

In a state in which the lens array is disposed between the photoelectric conversion device and the plurality of optical fibers in this way, the lens array optically couples light emitted from each light-emitting element of the photoelectric conversion device with an end face of each optical fiber. As a result, multichannel optical transmission can be performed.

In addition, among photoelectric conversion devices, some include a monitoring light-receiving element for monitoring light (particularly intensity or amount of light) emitted from the light-emitting elements to stabilize the output characteristics of the light-emitting elements. A lens array supporting such photoelectric conversion devices is configured to reflect some of the light emitted from the light-emitting elements towards the monitoring light-receiving element as monitor light.

As a lens array that includes a reflection function for generating the monitor light such as this, the inventors of the present invention have made proposals in the past, such as that in Patent Literature 1.

PRIOR ART LITERATURES

Patent Literature

Patent Literature 1: Japanese Patent Laid-open Publication No. 2011-133807

SUMMARY OF INVENTION

Problem to be Solved by the Invention

The lens array described in Patent Literature 1 is configured by a prism that has been coated with a reflective/transmissive layer being bonded within a recessing section of the lens array main body, which is composed of a resin material, using a light-transmissive adhesive. As a result of this lens array, the monitor light can be obtained with certainty by the reflective/transmissive layer dividing the light emitted from the light-emitting elements into fiber-coupled light (transmitted light) and the monitor light (reflected light).

As a result of keen research to further improve the above-described advantages of the lens array described in Patent Literature 1, the inventors of the present invention have achieved the present invention that is suitable for preventing the adhesive, which is intended to bond the prism in a state in which optical characteristics are ensured, from being formed on the optical path of the light from the light-emitting elements as foreign matter that compromises optical characteristics.

The present invention has been achieved in light of the above-described issues. An object of the present invention is to provide a lens array that is capable of efficiently obtaining monitor light while supporting size-reduction and increased channels, and capable of improving yield and simplifying operability, and a method for manufacturing the lens array.

Means for Solving Problem

To achieve the above-described object, a lens array according to a first aspect of the present invention is a lens array that is disposed between a photoelectric conversion device and an optical transmission body, the photoelectric conversion device in which a plurality of light-emitting elements are formed in an array and at least one light-receiving element is formed that receives monitor light for monitoring light emitted from at least one of the plurality of light-emitting elements, the lens array capable of optically coupling the plurality of light-emitting elements and end faces of the optical transmission body. The lens array includes: a plurality of first lens faces that are formed on a first surface of a lens array main body on the photoelectric conversion device side, such as to be arrayed in a predetermined array direction corresponding with the plurality of light-emitting elements and into which the light emitted from each of the plurality of light-emitting elements enters; a plurality of second lens faces that are formed on a second surface of the lens array main body on the optical transmission body side that is adjacent to the first surface in a direction perpendicular to the array direction, the plurality of second lens faces formed such as to be arrayed along the array direction and that emit the light of each of the plurality of light-emitting elements that has entered each of the plurality of first lens faces towards the end faces of the optical transmission body; at least one third lens face that is formed on the first surface in a position towards the second surface in relation to the plurality of first lens faces and that emits the monitor light that has entered from an inner side of the lens array main body towards the light-receiving element; a total reflection surface that is formed on a third surface of the lens array main body on a side opposite to the first surface, such as to oppose the plurality of first lens faces, and that totally reflects the light of each of the plurality of light-emitting elements that has entered the plurality of first lens faces towards the side of the plurality of second lens faces; a prism placement recessing section that is formed in a recessing manner on the third surface in a position that is towards the second surface side in relation to the total reflection surface and a position that opposes the third lens face, such as to be positioned on an optical path connecting the plurality of first lens faces and the plurality of second lens faces; a prism that is disposed within the prism placement recessing section and that forms an optical path for the light of each of the plurality of light-emitting elements that advances towards the side of the plurality of second lens faces; a reflective/transmissive layer that is disposed on an incident surface of the prism for the light of each of the plurality of light-emitting elements, the reflective/transmissive layer reflecting the light of each of the plurality of light-emitting elements that has been totally reflected by the total reflection surface towards the third lens face side at a predetermined reflection factor and transmitting the light of each of the plurality of light-emitting elements that has been totally reflected by the total reflection surface towards the incident surface side at a predetermined transmission factor, and at this time, reflecting at least the light of one of the plurality of light-emitting elements as the monitor light; a light-transmissive adhesive that fills a space between the prism placement recessing section and the prism and adheres the prism within the prism placement recessing section; a first air-bubble retention prevention recessing section that is formed in a recessing manner on the third surface such as to communicate with the prism placement recessing section in one array direction and such as to be off of the optical path of the light of each of the plurality of light-emitting elements, and that prevents retention of air-bubbles in the adhesive on the optical path of the light of each of the plurality of light-emitting elements between the prism placement recessing section and the prism during adhesion of the prism; a second air-bubble retention prevention recessing section that is formed in a recessing manner on the third surface such as to communicate with the prism placement recessing section in the other array direction and such as to be off the optical path of the light of each of the plurality of light-emitting elements, and that prevents retention of air-bubbles in the adhesive; and an adhesive flow prevention recessing edge section that is formed in a recessing manner on the third surface such as to surround respective openings of the prism placement recessing section, the first air-bubble retention prevention recessing section, and the second air-bubble retention recessing section, and that prevents flow of the adhesive onto the total reflection surface during adhesion of the prism.

A method for manufacturing a lens array according to a second aspect of the present invention is that in which a lens array according to the first aspect is manufactured by a prism according to the first aspect being adhered within a prism placement recessing section according to the first aspect by an adhesive according to the first aspect.

In the inventions according to the first and second aspects, when the prism is adhered within the prism placement recessing section by the adhesive, retention of air bubbles in the adhesive on the optical path of the light of each of the plurality of light-emitting elements between the prism placement recessing section and the prism can be prevented by the first air-bubble retention prevention recessing section and the second air-bubble retention prevention recessing section. In addition, the flow of the adhesive onto the total reflection surface can be prevented by the adhesive flow prevention recessing edge section. Therefore, the adhesive can be easily prevented from being formed as foreign matter that compromises optical characteristics on the optical path of the light of the light-emitting elements. In addition, because of a configuration in which excess adhesive can flow into the first air-bubble retention prevention recessing section and the second air-bubble retention prevention recessing section, an adhesive having a high contraction coefficient can be used. Therefore, restrictions applied to selection of adhesives can be relaxed.

Furthermore, a method for manufacturing a lens array according to a third aspect of the present invention is the method for manufacturing a lens array according to the second aspect in which, further, in a state in which the prism is disposed in the prism placement recessing section, the adhesive fills the space between the prism placement recessing section and the prism while being injected from either of a first air-bubble retention prevention recessing section and a second air-bubble retention prevention recessing section according to the first aspect and being sent to flow towards the other thereof.

In the invention according to the third aspect, when the prism is disposed in the prism placement recessing section before the adhesive, one air-bubble retention prevention recessing section can be used as an injection opening for the adhesive, and the other air-bubble retention prevention recessing section can be used as an area to which air bubbles in the adhesive are expelled. Therefore, filling of the adhesive can be facilitated, and retention of air bubbles can be efficiently prevented using the flow of the adhesive during injection.

Still further, a method for manufacturing a lens array according to a fourth aspect of the present invention is the method for manufacturing a lens array according to the second aspect in which, further, in a state in which the adhesive is disposed in the prism placement recessing section, by the prism being disposed in the prism placement recessing section, the adhesive fills the space between the prism placement recessing section and the prism while the adhesive is sent to flow towards a first air-bubble retention prevention recessing section and a second air-bubble retention prevention recessing section.

In the invention according to the fourth aspect, when the prism is disposed in the prism placement recessing section after the adhesive, air bubbles in the adhesive can be efficiently expelled to both the first air-bubble retention prevention recessing section and the second air-bubble retention prevention recessing section using the flow of the adhesive during prism disposition.

Effect of the Invention

In the present invention, monitor light can be efficiently obtained while supporting size-reduction and increased channels, and improved yield and simplified operability can be achieved.

BEST MODE(S) FOR CARRYING OUT THE INVENTION

A lens array and a method of manufacturing the lens array according to an embodiment of the present invention will hereinafter be described with reference to FIG. 1 to FIG. 21.

Figure 1:
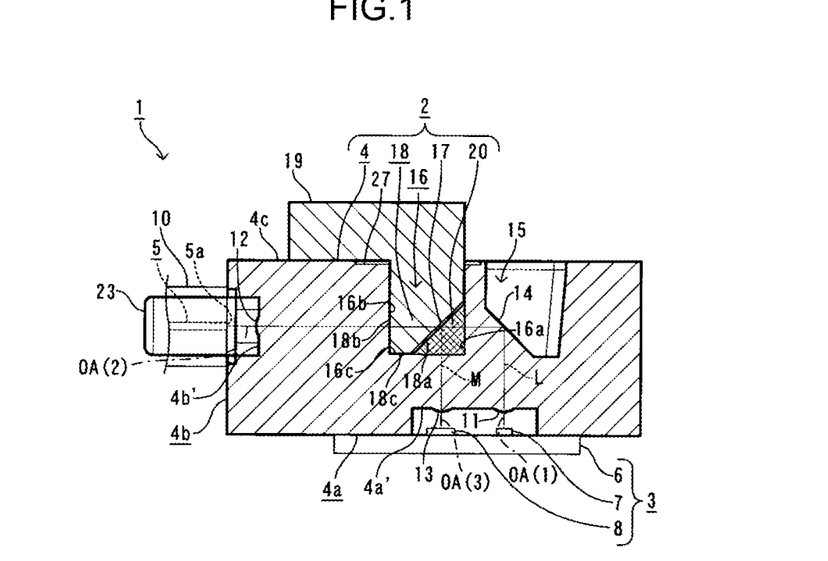
FIG. 1 A vertical cross-sectional view of a lens array according to an embodiment of the present invention (cross-section taken along A-A in FIG. 2).
Figure 2:
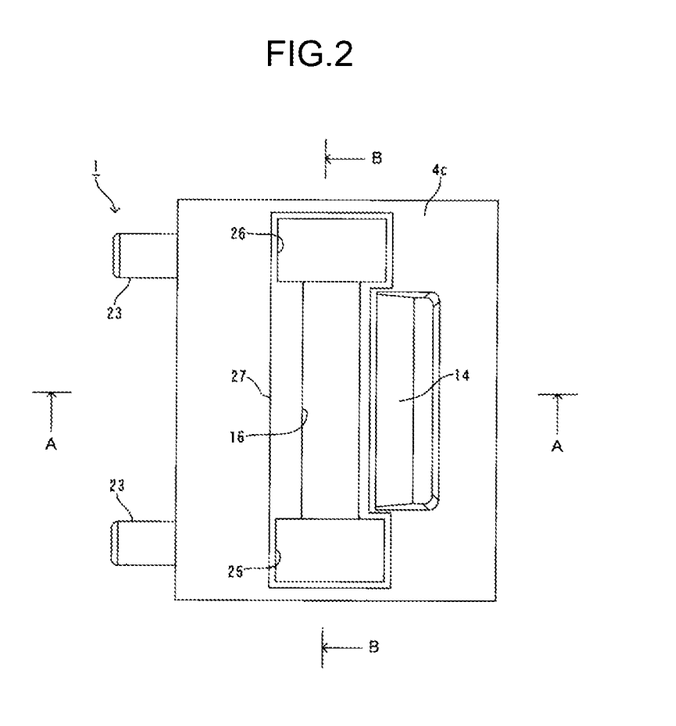
FIG. 2 A planar view of a lens array main body of the lens array in FIG. 1.
Figure 3:
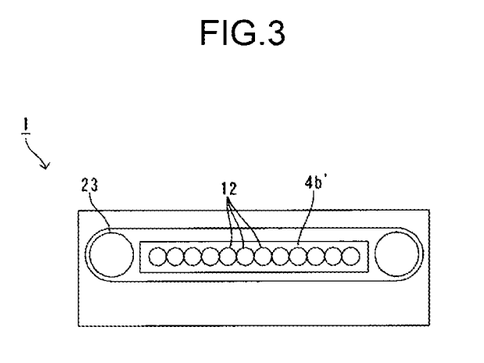
FIG. 3 A left-side view of the lens array main body of the lens array in FIG. 1.
Figure 4:
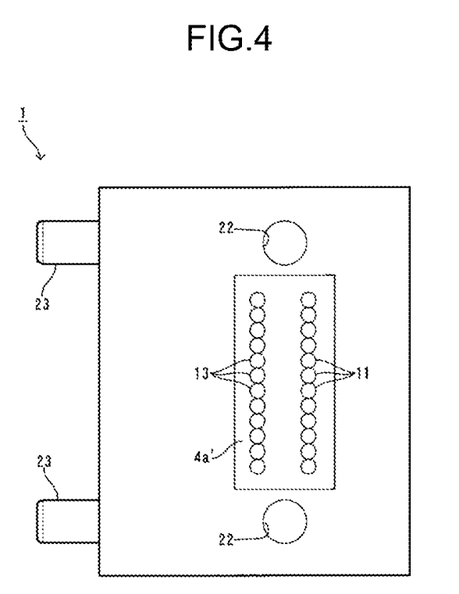
FIG. 4 A bottom view of the lens array main body of the lens array in FIG. 1.

FIG. 1 shows a vertical cross-sectional view of a lens array 1 according to the present embodiment (cross-section taken along A-A in FIG. 2), together with an overview of an optical module 2 that includes the lens array 1. In addition, FIG. 2 is a planar view of a lens array main body 4, described hereafter, of the lens array 1 shown in FIG. 1. Furthermore, FIG. 3 is a left-side view of the lens array main body 4 of the lens array 1 shown in FIG. 1. Still further, FIG. 4 is a bottom view of the lens array main body 4 of the lens array 1 shown in FIG. 1.

As shown in FIG. 1, the lens array 1 according to the present embodiment is disposed between a photoelectric conversion device 3 and optical fibers 5 serving as an optical transmission body.

Here, the photoelectric conversion device 3 has a plurality of light-emitting elements 7 on a surface of a semiconductor substrate 6 facing the lens array 1, the light emitting-elements 7 emitting laser light L in a direction perpendicular to this surface (upward direction in FIG. 1). The light-emitting elements 7 configure a vertical cavity surface emitting laser (VCSEL). In FIG. 1, the light-emitting elements 7 are formed in an array along a direction perpendicular to the surface of the paper on which FIG. 1 is printed. In addition, the photoelectric conversion device 3 has a plurality of light-receiving elements 8 on the surface of the semiconductor substrate 6 facing the lens array 1, in positions near the left-hand side in FIG. 1 of the light-emitting elements 7. The light-receiving elements 8 receive monitor light M for monitoring the output (such as intensity or amount of light) of the laser light L emitted from the light-emitting elements 7. The number of light-receiving elements 8 is the same as the number of light-emitting elements 7. The light-receiving elements 8 are formed in an array in the same direction as the light-emitting elements 7. The positions in the array direction match between corresponding elements 7 and 8. In other words, the light-receiving elements 8 are formed at the same pitch as the light-emitting elements 7. The light-receiving elements 8 may be configured by photodetectors. In addition, a control circuit (not shown) that controls the output of the laser light L emitted from the light-emitting elements 7 based on the intensity and the amount of light of the monitor light M received by the light-receiving elements 8 is connected to the photoelectric conversion device 3. The photoelectric conversion device 3 such as this is configured, for example, to be arranged opposing the lens array 1 in a state in which a contact surface of the semiconductor substrate 6 that comes into contact with the lens array 1 is in contact with the lens array 1. The photoelectric conversion device 3 is attached to the lens array 1 by a known fixing means.

In addition, the same number of optical fibers 5 according to the present embodiment as the number of light-emitting elements 7 and the number of light-receiving elements 8 are arranged. The optical fibers 5 are formed in an array along the direction perpendicular to the surface of the paper on which FIG. 1 is printed in FIG. 1. In addition, the optical fibers 5 are arrayed at the same pitch as the light-emitting elements 7. The optical fibers 5 are attached to the lens array 1 by a known fixing means, in a state in which a portion of each optical fiber 5 on an end face 5a side is held within a multi-core integrated optical connector 10.

The lens array 1 optically couples each light-emitting element 7 with the end face 5a of each optical fiber 5 in a state in which the lens array 1 is disposed between the photoelectric conversion device 3 and the optical fibers 5 such as those described above.

The lens array 1 will be described in further detail. As shown in FIG. 1, the lens array 1 has the lens array main body 4 composed of a light-transmitting resin material (such as polyetherimide). The lens array main body 4 is formed into a substantially rectangular parallelepiped plate shape.

As shown in FIG. 1 and FIG. 4, the lens array main body 4 has a plurality (12 lens faces) of first lens faces (convex lens faces in FIG. 1) 11 having a circular planar shape and formed on a lower end surface 4a in FIG. 1. The lower end surface 4a of the lens array main body 4 serves as a first surface to which the photoelectric conversion device 3 is attached. The number of first lens faces 11 is the same as the number of light-emitting elements 7. Here, as shown in FIG. 1, an area (referred to, hereinafter, as a first lens formation area) 4a' of the lower end surface 4a in which the first lens faces 11 are formed is formed into a counterbore surface that recesses further upwards than the area of the lower end surface 4a outside of the first lens formation area 4a'. However, the first lens formation area 4a' and the outer area are formed into planes that are parallel with each other. As shown in FIG. 1, the plurality of first lens faces 11 are formed such as to be arrayed in a predetermined array direction (the direction perpendicular to the surface of the paper on which FIG. 1 is printed in FIG. 1, and a vertical direction in FIG. 4) corresponding with the light-emitting elements 7. In addition, the first lens faces 11 are formed at the same pitch as the light-emitting elements 7. Furthermore, as shown in FIG. 1, an optical axis OA(1) of each first lens face 11 matches a center axis of the laser light L emitted from each light-emitting element 7 corresponding with each first lens face 11.

As shown in FIG. 1, the laser light L emitted from each light-emitting element 7 corresponding with each first lens face 11 enters each first lens face 11 such as this. Each first lens face 11 advances the incident laser light L of each light-emitting element 7 into the lens array main body 4, after refracting (for example, collimating) the laser light L in a direction based on the power of the first lens face 11.

As shown in FIG. 1 and FIG. 3, the lens array main body 4 has a plurality of second lens faces (convex lens faces in FIG. 1) 12 on a left end face 4b (planar surface) in FIG. 1 that serves as a second surface of the lens array 4 to which the optical fibers 5 are attached. The number of second lens faces 12 is the same as the number of first lens faces 11. Here, as shown in FIG. 1, an area (referred to, hereinafter, as a second lens formation area) 4b' of the left end surface 4b in which the second lens faces 12 are formed is formed into a counterbore surface that recesses further to the right than the area of the left end surface 4b outside of the second lens formation area 4b'. However, the second lens formation area 4b' and the outer area are formed into planes that are parallel with each other. In addition, as is clear in FIG. 1, the left end surface 4b is adjacent to the lower end surface 4a in a direction perpendicular to the array direction of the first lens faces 11 (referred to, hereinafter, as a lens array direction). As shown in FIG. 1, the plurality of second lens faces 12 are formed such as to be arrayed in the same direction as the lens array direction. In addition, the second lens faces 12 are formed at the same pitch as the first lens faces 11. An optical axis OA(2) of each second lens face 12 is preferably positioned on the same axis as the center axis of the end face 5a of each optical fiber 5 corresponding with each second lens face 12.

As shown in FIG. 1, the laser light L of each light-emitting element 7 that has entered each first lens face 11 corresponding with each second lens face 12 and advanced on the optical path within the lens array main body 4 enters each second lens face 12 in a state in which the center axis of the laser light L matches the optical axis OA(2) of each second lens face 12. Each second lens face 12 then emits the incident laser light L of each light-emitting element 7 towards the end face 5a of each optical fiber 5 corresponding with each second lens face 12.

In this way, each light-emitting element 7 and the end face 5a of each optical fiber 5 are optically coupled by first lens face 11 and the second lens face 12.

Furthermore, as shown in FIG. 1 and FIG. 4, third lens faces 13 are formed in the first lens formation area 4a' in a position near the left-hand side of the first lens faces 11. The number of third lens faces 13 is the same as the number of the light-receiving elements 8 (according to the present embodiment, the number of third lens faces 13 is also the same as the number of light-emitting elements 7, the number of optical fibers 5, the number of first lens faces 11, and the number of second lens faces 12). The third lens faces 13 are formed such as to be arrayed in a predetermined array direction corresponding with the light-receiving elements 8, or in other words, the same direction as the lens array direction. In addition, the third lens faces 13 are formed at the same pitch as the light-receiving elements 8. An optical axis OA(3) of each third lens face 13 preferably matches the center axis of a light-receiving surface of each light-receiving element 8 corresponding with each third lens face 13.

The monitor light M of each light-emitting element 7 corresponding with each third lens face 13 enters each third lens face 13 such as this from within the lens array main body 4, as shown in FIG. 1. Each third lens face 13 emits the incident monitor light M of each light-emitting element 7 towards each light-receiving element 8 corresponding with each third lens face 13.

Still further, as shown in FIG. 1 and FIG. 2, the lens array main body 4 has a total reflection surface 14 on an upper end surface 4c (surface on the side opposite to the lower end surface 4a) in FIG. 1 that serves as a third surface, in a position opposing the first lens faces 11. As shown in FIG. 1, the upper end surface 4c is formed in parallel with the lower end surface 4a. In addition, as shown in FIG. 1, the total reflection surface 14 is composed of an inner sloped surface 14 of a recessing section 15 formed in a recessing manner on the upper end surface 4c. The recessing section 15 has a substantially pentagonal vertical cross-sectional shape. In other words, as shown in FIG. 1, the total reflection surface 14 is formed into a sloped surface of which an upper end portion thereof is positioned further towards the left side (towards a prism placement recessing section 16 side, described hereafter) in FIG. 1 than a lower end portion thereof. The total reflection surface 14 is disposed on the optical path of the laser light L of each light-emitting element 7, between the first lens faces 11 and a right inner surface 16a of the prism placement recessing section 16, described hereafter. The slope angle of the total reflection surface 14 is preferably 45° in the clockwise direction in FIG. 1, with reference to the lower end surface 4a (0°).

As shown in FIG. 1, the laser light L of each light-emitting element 7 that has entered each first lens face 11 enters the total reflection surface 14 such as this at an angle of incidence that is greater than the critical angle, from below in FIG. 1. The total reflection surface 14 then totally reflects the incident laser light L of each light-emitting element 7 towards the left side in FIG. 1 that is the second lens face 12 side.

In addition, as shown in FIG. 1 and FIG. 2, the prism placement recessing section 16 is formed in a recessing manner on the upper end surface 4c of the lens array main body 4, in a position on the left side (left end surface 4b side) of the total reflection surface 14 that is also a position opposing the third lens faces 13. The prism placement recessing section 16 has a rectangular vertical cross-sectional shape and a rectangular planar shape that is elongated in the lens array direction. The depth of the prism placement recessing section 16 is formed to be at least positioned on the optical path connecting the first lens faces 11 and the second lens faces 12. In addition, the width of the prism placement recessing section 16 in the lens array direction is less than that of the lens array main body 4.

Here, as shown in FIG. 1, the right inner surface 16a forming a portion of the inner surface of the prism placement recessing section 16 is formed in parallel with the second lens formation area 4b'. As shown in FIG. 1, the laser light L of each light-emitting element 7 that has been totally reflected by the total reflection surface 14 perpendicularly enters the right inner surface 16a.

In addition, as shown in FIG. 1, a left inner surface 16b forming a portion of the inner surface of the prism placement recessing section 16 is formed in parallel with the second lens formation area 4b'. As shown in FIG. 1, the laser light L of each light-emitting element 7 that has entered the right inner surface 16a and advanced towards the second lens face 12 side perpendicularly enters the left inner surface 16b. The left inner surface 16b then perpendicularly transmits the incident laser light L of each light-emitting element 7.

Furthermore, as shown in FIG. 1, a prism 18 is disposed in the space formed by the prism placement recessing section 16. The prism 18 has a substantially pentagonal vertical cross-sectional shape and is composed of a light-transmitting material. The prism 18 forms an optical path of the laser light L of each light-emitting element 7 that is advancing towards the second lens face 12 side. A plate-shaped shoulder section 19 is integrally formed in an upper portion of the prism 18. The shoulder section 19 is provided for convenience, such as in handling the compact prism 18 (for placement into the prism placement recessing section 16) and to prevent infiltration of foreign matter (such as dust) into the prism placement recessing section 16.

Here, as shown in FIG. 1, the prism 18 has an incident surface 18a for the laser light L of each light-emitting element 7 in a position facing the right inner surface 16a of the prism placement recessing section 16 from the left side. As shown in FIG. 1, the incident surface 18a is formed into a sloped surface such that a lower end portion thereof is positioned further to the left side than an upper end portion thereof. The slope angle of the incident surface 18a is preferably 45° in the counter-clockwise direction in FIG. 1, with reference to the lower end surface 4a.

In addition, as shown in FIG. 1, the prism 18 has an outgoing surface 18b for the laser light L of each light-emitting element 7 in a position opposing the incident surface 18a from the left side. As shown in FIG. 1, the outgoing surface 18b is formed in parallel with the second lens formation area 4b' and is disposed in close contact with the left inner surface 16b of the prism placement recessing section 16.

Furthermore, as shown in FIG. 1, a bottom surface 18c of the prism 18 connected between the lower end portion of the incident surface 18a and the lower end portion of the outgoing surface 18b is in contact with an inner bottom surface 16c of the prism placement recessing section 16.

The prism 18 such as this perpendicularly emits from the outgoing surface 18b the laser light L of each light-emitting element 7 that has entered from the incident surface 18a Furthermore, as shown in FIG. 1, a reflective/transmissive layer 17 having a thin thickness is disposed on the incident surface 18a of the prism 18.

Still further, as shown in FIG. 1, a light-transmissive adhesive 20 fills the space between the prism placement recessing section 16 and the prism 18. The difference in refraction index between the prism 18 and the adhesive 20 is a predetermined value (such as 0.05) or less. As a result of the adhesive 20, the prism 18 is stably adhered within the prism placement recessing section 16. The adhesive 20 may be an acrylate adhesive or an epoxy adhesive serving as an ultraviolet-curable resin, In an instance in which the prism 18 is composed of SD1414 which is a polycarbonate manufactured by Teijin Chemicals Ltd., the adhesive 20 may be composed of EA-F5003 manufactured by Osaka Gas Chemicals Co., Ltd. In this instance, the refractive index of both the prism 18 and the adhesive 20 is 1.59 (difference in refractive index 0.00) at a wavelength of 850 nm.

Here, as shown in FIG. 1, the laser light L of each light-emitting element 7 that has perpendicularly entered the right inner surface 16a of the prism placement recessing section 16 from the total reflection surface 14 side perpendicularly enters the adhesive 20 immediately thereafter. The light L of each light-emitting element 7 then advances towards the second lens face 12 side without being refracted on the optical path within the adhesive 20, and subsequently enters the reflective/transmissive layer 17.

Then, the reflective/transmissive layer 17 reflects the laser light L of each light-emitting element 7 that has entered in this way towards the third lens face 13 side at a predetermined reflection factor. In addition, the reflective/transmissive layer 17 transmits the laser light L of each light-emitting element 7 that has entered in this way towards the incident surface 18a side (in other words, the second lens face 12 side) of the prism 18 at a predetermined transmission factor. As the reflection factor and the transmission factor of the reflective/transmissive layer 17, desired values can be set depending on the material, thickness, and the like of the reflective/transmissive layer 17, to the extent that an amount of monitor light M sufficient for monitoring the output of the laser light L can be obtained. For example, when the reflective/transmissive layer 17 is formed by a single-layer film composed of a single metal, such as Ni, Cr, or Al, the reflection factor of the reflective/transmissive layer 17 can be 20% and the transmission factor can be 60% (absorption factor 20%), although depending on the thickness thereof. In addition, for example, when the reflective/transmissive layer 17 is formed by a dielectric multilayer film obtained by a plurality of dielectrics having differing dielectric constants (such as $TiO_2$ and $SiO_2$) being alternately stacked, the reflection factor of the reflective/transmissive layer 17 can be 10% and the transmission factor can be 90%, although depending on the thickness and the number of layers thereof. Furthermore, the reflective/transmissive layer 17 may be formed by the above-described metal single-layer film or dielectric multilayer film being coated on the incident surface 18a. A known coating technique, such as Inconel deposition, can be used for coating. When a coating technique such as this is used, the reflective/transmissive layer 17 can be formed into a very thin thickness (such as 1 μm or less).

As shown in FIG. 1, during reflection or transmission such as this, the reflective/transmissive layer 17 reflects some (light amounting to the reflection factor) of the laser light L of each light-emitting element 7 that has entered the reflective/transmissive layer 17 as the monitor light M of each light-emitting element 7 corresponding with each light-emitting element 7, towards the third lens face 13 corresponding with each beam of monitor light M.

Furthermore, the monitor light M of each light-emitting element 7 reflected by the reflective/transmissive layer 17 in this way advances within the adhesive 20 towards the third lens face 13 side, and subsequently enters the inner bottom surface 16c of the prism placement recessing section 16 that is parallel with the first lens formation area 4a'. Then, the monitor light M of each light-emitting element 7 that has entered the inner bottom surface 16c advances within the lens array main body 4, and is emitted from each third lens face 13 towards each light-receiving element 8 corresponding with each third lens face 13.

On the other hand, the laser light L of each light-emitting element 7 transmitted by the reflective/transmissive layer 17 enters the incident surface 18a of the prism 18 immediately after transmittance and advances towards the second lens face 12 side on the optical path within the prism 18.

At this time, because the reflective/transmissive layer 17 is very thin, the refraction that occurs when the laser light L of each light-emitting element 7 is transmitted through the reflective/transmissive layer 17 is small enough to be ignored. In addition, because the difference in refractive index between the prism 18 and the adhesive 20 is extremely small, the refraction of the laser light L of each light-emitting element 7 when the laser light L enters the incident surface 18a is also small enough to be ignored. As a result, the laser light L of each light-emitting element 7 that has advanced on the optical path within the prism 18 is perpendicularly emitted outside of the prism 18 from the outgoing surface 18b of the prism 18.

The laser light L of each light-emitting element 7 that has been perpendicularly emitted from the prism 18 in this way perpendicularly enters the left inner surface 16b of the prism placement recessing section 16 as described above, immediately after being emitted. Then, the laser light L of each light-emitting element 7 that has perpendicularly entered the left inner surface 16*b* advances towards the second lens face 12 side on the optical path within the lens array main body 4 subsequent to the left inner surface 16*b*, and is then emitted from each second lens face 12 towards the end face 5*a* of each optical fiber 5 corresponding with each second lens face 12.

In the above-described configuration, the laser light L of each light-emitting element 7 that has entered each first lens face 11 is separated by the reflective/transmissive layer 17 to the second lens face 12 side and the third lens face 13 side. The monitor light M that has been separated to the third lens face 13 side can be emitted from each third lens face 13 towards the light-receiving element 8 side. As a result, the monitor light M can be obtained with certainty. In addition, as a result of the reflective/transmissive layer 17 that has a certain amount of area and is easily formed being used as the configuration for obtaining the monitor light M such as this, the lens array 1 can be easily manufactured. In addition, as a result of the perpendicular incidence (refraction prevention) on the right inner surface 16*a* of the prism placement recessing section 16 and suppression of refraction during incidence on the prism 18, the optical path of the laser light L of each light-emitting element 7 within the prism 18 can be maintained perpendicular to the second lens formation area 4*b*' (in other words, parallel with the optical axis OA(2) of the second lens face 12). Furthermore, the laser light L of each light-emitting element 7 that has advanced on the optical path within the prism 18 such as this can perpendicularly enter the left inner surface 16*b* of the prism placement recessing section 16. As a result, the optical paths of the laser light L of each light-emitting element 7 within the lens array main body 4 can be positioned on the same line as each other for the incidence side to the right inner surface 16*a* (between the total reflection surface 14 and the right inner surface 16*a* in FIG. 1) and the outgoing side to the left inner surface 16*b*. As a result, for example, during product inspection, when the laser light L of each light-emitting element 7 entering each second lens face 12 is confirmed to be misaligned from the center of each second lens face 12, the number of areas requiring dimension adjustment (such as modification of mold shape) to solve this misalignment can be reduced.

In addition, as shown in FIG. 4, hole sections 22 are formed in the first lens formation area 4*a*' on both outer positions in the lens array direction (vertical direction in FIG. 4). The hole sections 22 each have a circular planar shape. The hole sections 22 each engage with a pin (not shown) that is formed on the semiconductor substrate 6 side, so as to be used for mechanical positioning of the photoelectric conversion device 3 when fixing the photoelectric conversion device 3 to the lens array 1. Furthermore, as shown in FIG. 3, pins 23 are formed in the second lens formation area 4*b*' on both outer positions in the lens array direction (lateral direction in FIG. 3). The pins 23 each have a circular planar shape. The pins 23 are each inserted into a hole portion (not shown) formed on the connector 10 side of the optical fibers 5, so as to be used for mechanical positioning of the optical fibers 5 when fixing the optical fibers 5 to the lens array 1.

In addition to including a configuration such as that above, the lens array 1 according to the present embodiment includes a means for preventing the adhesive 20 from being formed as foreign matter than compromises optical characteristics on the optical paths of the laser light L and the monitor light M of each light-emitting element, when the prism 18 is adhered within the prism placement recessing section 16 by the adhesive 20.

Figure 5:
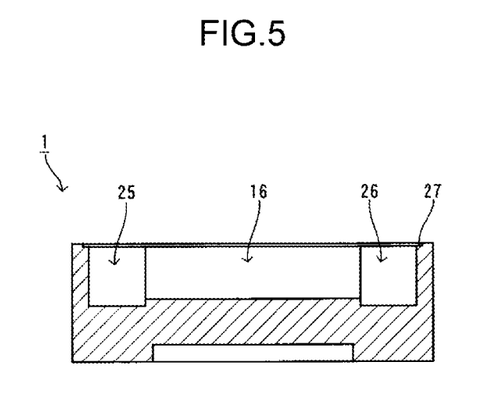
FIG. 5 A cross-sectional view taken along B-B in FIG. 2.

In other words, as shown in FIG. 2 and FIG. 5, a first air-bubble retention prevention recessing section 25 is formed in a recessing manner on the upper end surface 4*c* in a position on one side (lower side in FIG. 2) of the lens array direction (vertical direction in FIG. 2) in relation to the prism placement recessing section 16. The first air-bubble retention prevention recessing section 25 prevents the retention of air bubbles in the adhesive 20 on the optical paths of the lights L and M of each light-emitting element 7 between the prism placement recessing section 16 and the prism 18, during adhesion of the prism 18. As shown in FIG. 2, the first air-bubble retention prevention recessing section 25 communicates with the prism placement recessing section 16 at one end portion (lower end portion in FIG. 2) in the lens array direction. In addition, as a result of the first air-bubble retention prevention recessing section 25 being positioned on the outer side of the prism placement recessing section 16 in the lens array direction, the first air-bubble retention prevention recessing section 25 is off of the optical paths of the lights L and M of each light-emitting element 7 between the prism placement recessing section 16 and the prism 18. Furthermore, in FIG. 2, the first air-bubble retention prevention recessing section 25 is formed into a rectangular shape that is larger to the left and right in FIG. 2 than the prism placement recessing section 16.

In addition, as shown in FIG. 2 and FIG. 5, a second air-bubble retention prevention recessing section 26 is formed in a recessing manner on the upper end surface 4*c* in a position on the other side (upper side in FIG. 2) of the lens array direction in relation to the prism placement recessing section 16. The second air-bubble retention prevention recessing section 26, together with the first air-bubble retention prevention recessing section 25 prevents the retention of air bubbles in the adhesive 20 on the optical paths of the lights L and M of each light-emitting element 7 between the prism placement recessing section 16 and the prism 18, during adhesion of the prism 18. As shown in FIG. 2, the second air-bubble retention prevention recessing section 26 communicates with the prism placement recessing section 16 at an end portion (upper end portion in FIG. 2) on the side opposite to the first air-bubble retention prevention recessing section 25 in the lens array direction. In addition, in a manner similar to the first air-bubble retention prevention section 25, as a result of the second air-bubble retention prevention recessing section 26 also being positioned on the outer side of the prism placement recessing section 16 in the lens array direction, the second air-bubble retention prevention recessing section 26 is off of the optical paths of the lights L and M of each light-emitting element 7 between the prism placement recessing section 16 and the prism 18. Furthermore, in FIG. 2, in a manner similar to the first air-bubble retention prevention section 25, the second air-bubble retention prevention recessing section 26 is formed into a rectangular shape that is larger to the left and right in FIG. 2 than the prism placement recessing section 16.

Furthermore, as shown in FIG. 2 and FIG. 5, the respective openings of the prism placement recessing section 16, the first air-bubble retention prevention recessing section 25, and the second air-bubble retention prevention recessing section 26 form a shape that is integrated with each other (an H-shape in FIG. 2) on the upper end surface 4*c*. In addition, as shown in FIG. 2, an opening outer peripheral edge section 27 of a predetermined area on the upper end surface 4*c* encloses the overall openings of the prism placement recessing section 16, the first air-bubble retention prevention recessing section 25, and the second air-bubble retention prevention recessing section 26. The opening outer peripheral edge section 27 recessed further downward in FIG. 5 than the surrounding (outer) upper end surface 4c by a predetermined dimension. The opening outer peripheral edge section 27 serves as an adhesive flow prevention recessing edge section 27 for preventing the adhesive 20 from flowing onto the total reflection surface 14 during adhesion of the prism 18.

In a configuration such as this, when the prism 18 is adhered within the prism placement recessing section 16 by the adhesive 20, the first air-bubble retention prevention recessing section 25 and the second air-bubble retention prevention recessing section 26 prevent retention of air-bubbles in the adhesive 20 on the optical paths of the lights L and M of each light-emitting element 7 between the prism placement recessing section 16 and the prism 18. In addition, at this time, even should the adhesive 20 overflow from the opening of the prism placement recessing section 16, the excess adhesive 20 can be collected in the adhesive flow prevention recessing edge section 27. Therefore, the adhesive 20 can be prevented from flowing onto the total reflection surface 14 through the upper end surface 4c as a result of capillary action. In this way, the adhesive 20 can be prevented from being formed as foreign matter that compromises optical characteristics on the optical paths of the lights L and M of each light-emitting element 7.

When largely classified, there are two methods for adhering the prism 18 within the prism placement recessing section 16 by the adhesive 20. In a first method, after the prism 18 is disposed in the prism placement recessing section 16 before disposition of the adhesive 20, the space between the prism placement recessing section 16 and the prism 19 is filled with the adhesive 20 and the adhesive 20 is hardened (such as ultraviolet-curing). In a second method, after the adhesive 20 is disposed within the prism placement recessing section 16, the prism 18 is disposed and the adhesive 20 is hardened. The present invention can achieve desired working effects in instances in which either method is used. In other words, when the first method is used, in a state in which the prism 18 is disposed in a predetermined position within the prism placement recessing section 16, the adhesive 20 can fill the space between the prism placement recessing section 16 and the prism 18 while being injected from either of the first air-bubble retention prevention recessing section 25 and the second air-bubble retention prevention recessing section 26 and sent to flow to the other. In a method such as this, one of the air-bubble retention prevention recessing sections 25 and 26 can be used as an injection opening for the adhesive 20, and the other air-bubble retention prevention recessing section 25 or 26 can be used as an area to which the air bubbles formed in the adhesive 20 are expelled. Therefore, in addition to filling of the adhesive 20 being facilitated, retention of air bubbles formed in the adhesive 20 can be efficiently prevented using the flow of the adhesive 20 during injection. For injection of the adhesive 20, a known injection device can be used. On the other hand, when the second method is used, by using the flow of the adhesive 20 when the prism 18 is inserted into the prism placement recessing section 16 in which the adhesive 20 is disposed, the air bubbles formed in the adhesive 20 can be efficiently expelled to both the first air-bubble retention prevention recessing section 25 and the second air-bubble retention prevention recessing section 26.

In the present invention, various variation examples, such as those below, may be applied as the vertical cross-sectional shape of the lens array 1.

Variation Examples of the Vertical Cross-Sectional Shape of the Lens Array

First Variation Example

Figure 6:
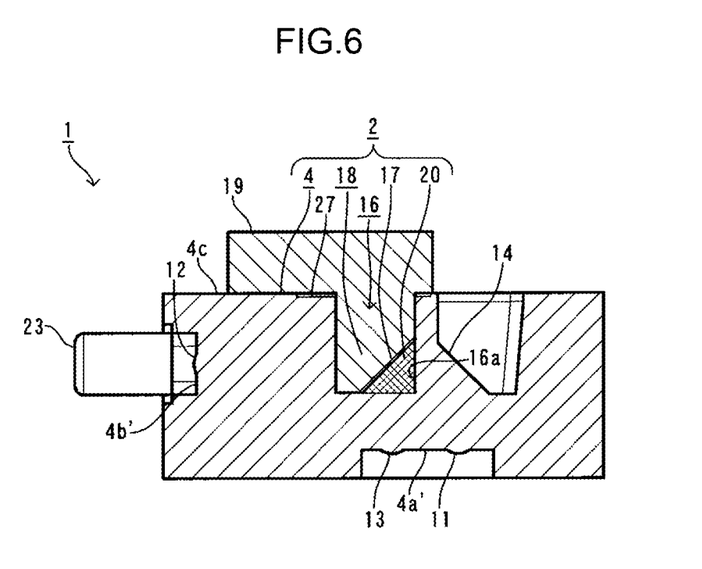
FIG. 6 A configuration diagram of a first variation example of a vertical cross-sectional shape of the lens array.

For example, as shown in FIG. 6, as a result of a right end portion of the shoulder section 19 connected to the prism 18 being extended further to the right than the right inner surface 16a of the prism placement recessing section 16, disposition of the prism 18 can be facilitated and stabilized.

Second Variation Example

Figure 7:
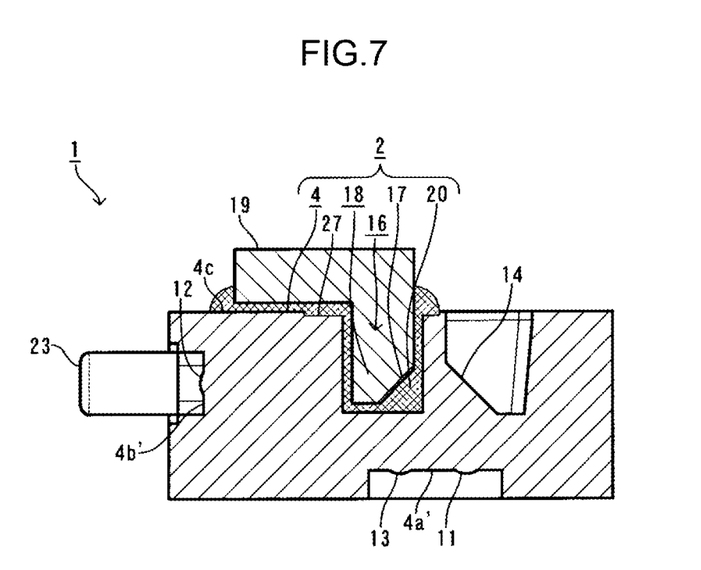
FIG. 7 A configuration diagram of a second variation example of a vertical cross-sectional shape of the lens array.

In addition, as shown in FIG. 7, the adhesive 20 may evenly fill the space between the prism placement recessing section 16 and the prism 18 (over the overall inner surface of the prism placement recessing section 16), and may fill the space between the shoulder section 19 and the upper end surface 4c, thereby achieving increased adhesive force on the prism 18.

Third Variation Example

Figure 8:
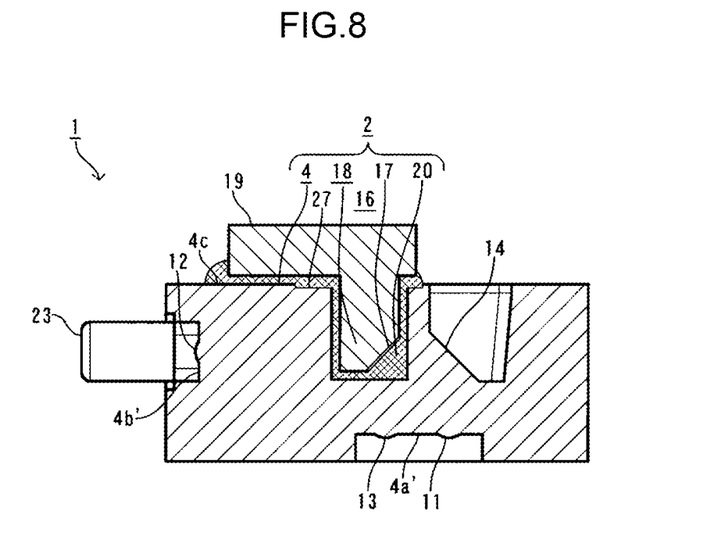
FIG. 8 A configuration diagram of a third variation example of a vertical cross-sectional shape of the lens array.

Furthermore, as shown in FIG. 8, the first variation example and the second variation example may be combined.

Example 1

Figure 9:
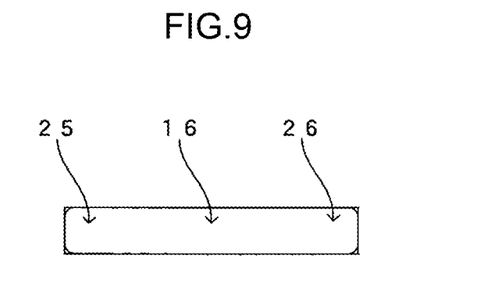
FIG. 9 An overall planar view of a first present invention product in Example 1.
Figure 10:
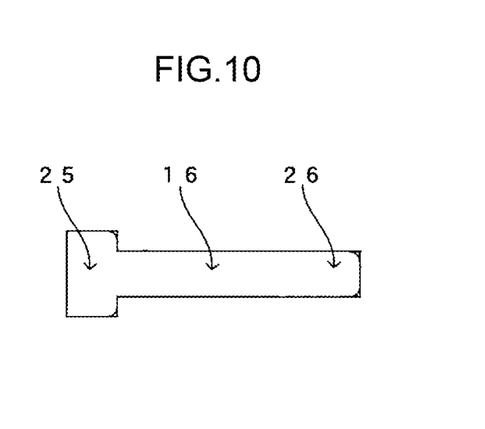
FIG. 10 An overall planar view of a second present invention product in Example 1.
Figure 11:
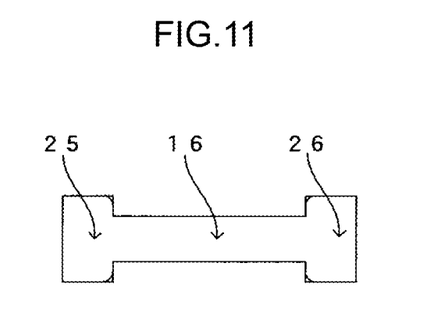
FIG. 11 An overall planar view of a third present invention product in Example 1.
Figure 12:
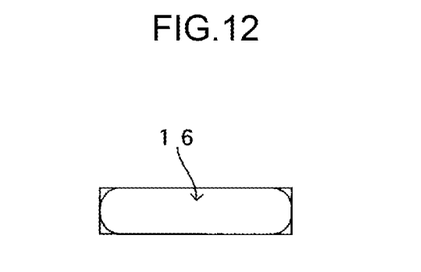
FIG. 12 An overall planar view of a conventional product in Example 1.

Next, in Example 1 described hereafter, an experiment was conducted to check the effects of the first air-bubble retention prevention recessing section 25 and the second air-bubble retention prevention recessing section 26 in the lens array 1. In the present experiment, as schematically shown in FIG. 9 to FIG. 11, three samples (referred to, hereinafter, as a first present invention product, a second present invention product, and a third present invention product) of which the planar shapes of the air-bubble retention prevention recessing sections 25 and 26 differ were used. In addition, in the present experiment, as schematically shown in FIG. 12, a sample (referred to, hereinafter, as a conventional product) having only the prism placement recessing section 16 was used as a comparison example. In all samples, the depths of the recessing sections 16, 25, and 26 are the same.

Here, as schematically shown in FIG. 9, in the first present invention product, the first air-bubble retention prevention recessing section 25 and the second air-bubble retention prevention recessing section 26 are both formed into a rectangular shape with the same width in the direction perpendicular to the lens array direction as that of the prism placement recessing section 16. The overall recessing sections 16, 25, and 26 form a lateral linear shape. The sample is equivalent to that in which the prism placement recessing section 16 of the convention product is extended in the lens array direction. The air-bubble retention prevention recessing sections 25 and 26 shaped in this way have an advantage in that the mold shape can be simplified.

In addition, as schematically shown in FIG. 10, in the second present invention product, the first air-bubble retention prevention recessing section 25 is formed into a rectangular shape that is larger that the prism placement recessing section 16 in both direction perpendicular to the lens array direction (up/down direction in FIG. 10). On the other hand, the second air-bubble retention prevention recessing section 26 is formed into a rectangular shape having the same width in the direction perpendicular to the lens array direction as that of the prism placement recessing section 16. This sample has an advantage in that the adhesive 20 can be easily injected from the first air-bubble retention prevention recessing section 25.

Furthermore, as schematically shown in FIG. 11, in the third present invention product, the first air-bubble retention prevention recessing section 25 and the second air-bubble retention prevention recessing section 26 are both formed into a rectangular shape that is larger that the prism placement recessing section 16 in both directions perpendicular to the lens array direction (up/down direction in FIG. 11). The planar shape of the third present invention product is reflected in the configuration shown in FIG. 2.

In the present experiment, three samples each of the first to third present invention product and the conventional product were prepared. The presence of air bubbles in the adhesive 20 between the prism placement recessing section 16 and the prism 18 was evaluated by outer appearance inspection on all prepared samples. The experiment results are as shown in Table 1, below.

TABLE 1

|  | PRACTICAL EXAMPLE 1 | | | COMPARATIVE |
| --- | --- | --- | --- | --- |
|  | 1st Invention Product | 2nd Invention Product | 3rd Invention Product | EXAMPLE Conventional Product |
| Not detectable | 3 | 3 | 3 | 1 |
| Detectable | 0 | 0 | 0 | 2 |

As shown in Table 1, air bubbles were not detected in any of the respective three samples of the first to third present invention products. On the other hand, air bubbles were detected in one of three samples of the conventional product. Therefore, it can be said that in the first to third present invention products, retention of air bubbles in the adhesive 20 is suppressed with certainty by the first air-bubble retention prevention recessing section 25 and the second air-bubble retention prevention recessing section 26. Regarding the present invention products in which air bubbles were not detected in this way, attachment of the adhesive 20 on the total reflection surface 14 was not found from outer appearance. This indicates that the adhesive flow prevention recessing edge section 27 is functioning appropriately.

Various variation examples, such as those below, may be applied as the planar shapes of the first air-bubble retention prevention recessing section 25 and the second air-bubble retention prevention recessing section 26.

Figure 13:
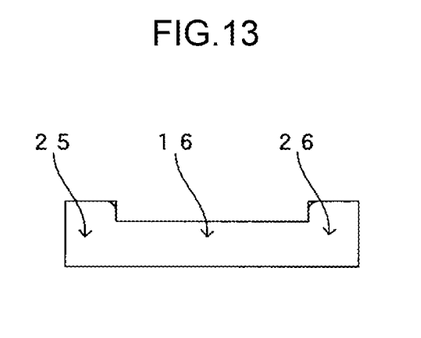
FIG. 13 An overall planar view of a first variation example in Example 1.

Variation Examples of the Planar Shape of the Air-Bubble Retention Prevention Recessing Section First Variation Example For example, as shown in FIG. 13, the first air-bubble retention prevention recessing section 25 and the second air-bubble retention prevention recessing section 26 may both be formed such as to be larger than the prism placement recessing section 16 in one direction perpendicular to the lens array direction (upward in FIG. 13).

Second Variation Example

Figure 14:
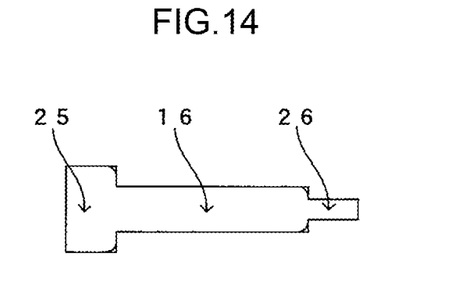
FIG. 14 An overall planar view of a second variation example in Example 1.

In addition, as shown in FIG. 14, the first air-bubble retention prevention recessing section 25 may be formed such as to be larger than the prism placement recessing section 16 in both directions perpendicular to the lens array direction (up/down direction in FIG. 14). On the other hand, the second air-bubble retention prevention recessing section 26 may be formed such as to be smaller than the prism placement recessing section 16 in the same directions.

Third Variation Example

Figure 15:
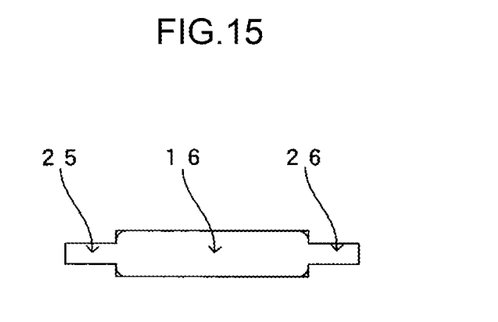
FIG. 15 An overall planar view of a third variation example in Example 1.

Furthermore, as shown in FIG. 15, the first air-bubble retention prevention recessing section 25 and the second air-bubble retention prevention recessing section 26 may both be formed such as to be smaller in than the prism placement recessing section 16 in both directions perpendicular to the lens array direction (up/down direction in FIG. 15).

Example 2

Figure 16:
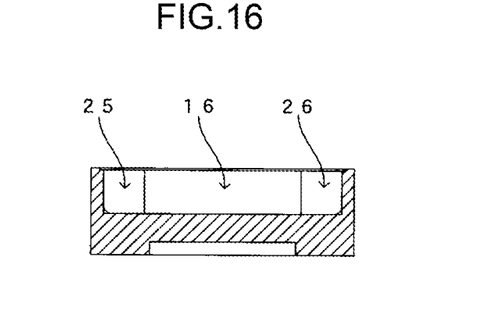
FIG. 16 An overall planar view of a first present invention product in Example 2.
Figure 17:
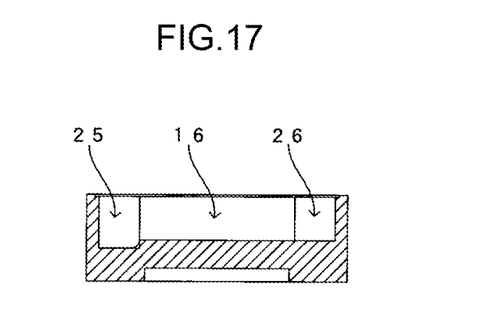
FIG. 17 An overall planar view of a second present invention product in Example 2.
Figure 18:
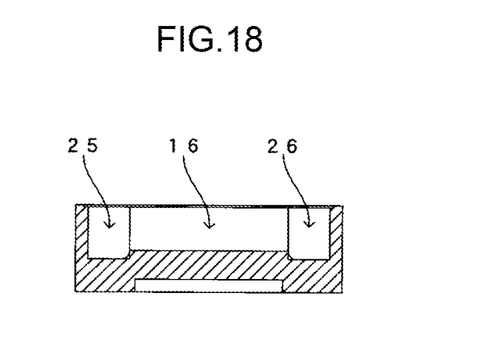
FIG. 18 An overall planar view of a third present invention product in Example 2.
Figure 19:
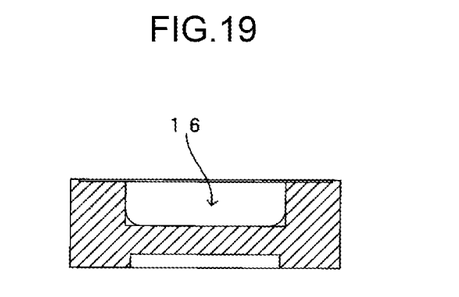
FIG. 19 An overall planar view of a conventional product in Example 2.

Next, in Example 2 described below, in a manner similar to Example 1, an experiment was conducted to check the effects of the first air-bubble retention prevention recessing section 25 and the second air-bubble retention prevention recessing section 26 in the lens array 1. However, as schematically shown in FIG. 16 to FIG. 18, the first to third present invention products in the present example used in the present experiment differ not in the planar shape of each air-bubble retention prevention recessing section 25 and 26, but in the horizontal cross-sectional shape (equivalent to the shape of the cross-section B-B in FIG. 2). In addition, as schematically shown in FIG. 19, in the present experiment as well, the conventional product is used as the comparison example. In all samples, the overall planar shape of the recessing sections 16, 25, and 26 are the same (equivalent to FIG. 9).

Here, as schematically shown in FIG. 16, in the first present invention product in the present example, the first air-bubble retention prevention recessing section 25 and the second air-bubble retention prevention recessing section 26 are both formed having the same depth as the prism placement recessing section 16. The sample is equivalent to that in which the prism placement recessing section 16 of the conventional product is extended in the lens array direction. The air-bubble retention prevention recessing sections 25 and 26 shaped in this way have an advantage in that the mold shape can be simplified.

In addition, as shown in FIG. 17, in the second present invention product in the present example, the first air-bubble retention prevention recessing section 25 is formed deeper than the prism placement recessing section 16. On the other hand, the second air-bubble retention prevention recessing section 26 is formed having the same depth as the prism placement recessing section 16.

Furthermore, as shown in FIG. 18, in the third present invention product in the present example, the first air-bubble retention prevention recessing section 25 and the second air-bubble retention prevention recessing section 26 are both formed deeper than the prism placement recessing section 16. The horizontal cross-sectional shape of the third present invention product is reflected in the configuration shown in FIG. 5.

In the present experiment, the presence of air bubbles in the adhesive 20 between the prism placement recessing section 16 and the prism 18 was evaluated in the same manner as that in Example 1, for the first to third present invention products and the conventional product in the present example. The experiment results are as shown in Table 2, below.

TABLE 2

|  | PRACTICAL EXAMPLE 2 | | | COMPARATIVE |
| --- | --- | --- | --- | --- |
|  | 1st Invention Product | 2nd Invention Product | 3rd Invention Product | EXAMPLE Conventional Product |
| Not detectable | 3 | 3 | 3 | 1 |
| Detectable | 0 | 0 | 0 | 2 |

As shown in Table 2, whereas no air bubbles were detected in any of the respective three samples of the first to third present invention products in the present example, air bubbles were detected in one of the three samples of the conventional product. Therefore, it can be said that, in the first to third present invention products in the present example as well, retention of air bubbles in the adhesive 20 is suppressed with certainty by the first air-bubble retention prevention recessing section 25 and the second air-bubble retention prevention recessing section 26.

Various variation examples, such as those below, may be applied as the horizontal cross-sectional shapes of the first air-bubble retention prevention recessing section 25 and the second air-bubble retention prevention recessing section 26.

Figure 20:
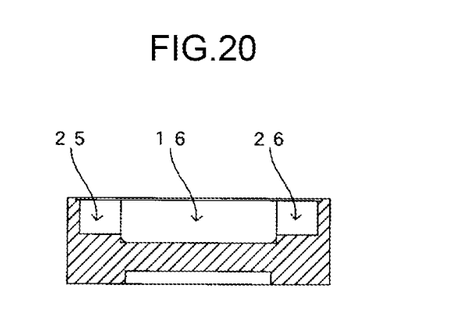
FIG. 20 An overall planar view of a first variation example in Example 2.

Variation Examples of the Horizontal Cross-Sectional Shape of the Air-Bubble Retention Prevention Recessing Section First Variation Example For example, as shown in FIG. 20, the first air-bubble retention prevention recessing section 25 and the second air-bubble retention prevention recessing section 26 may be formed shallower than the prism placement recessing section 16.

Second Variation Example

Figure 21:
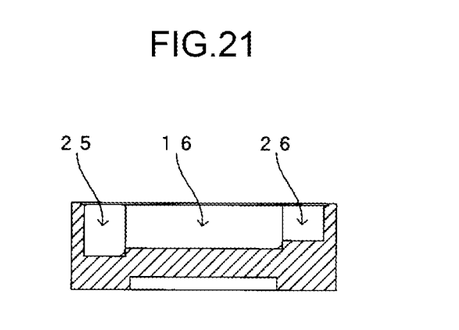
FIG. 21 An overall planar view of a second variation example in Example 2.

In addition, as shown in FIG. 21, the first air-bubble retention prevention recessing section 25 may be formed deeper than the prism placement recessing section 16, and on the other hand, the second air-bubble retention prevention recessing section 26 may be formed shallower than the prism placement recessing section 16.

The present invention is not limited to the above-described embodiment. Various modifications can be made to an extent that the features of the present invention are not compromised.

For example, the planar shapes of the air-bubble retention prevention recessing sections 25 and 26 indicated in Example 1 and the horizontal cross-sectional shapes of the air-bubble retention prevention recessing sections 25 and 26 indicated in Example 2 may be combined, thereby configuring air-bubble retention prevention recessing sections 25 and 26 that have desired three-dimensional shapes.

EXPLANATIONS OF LETTERS OR NUMERALS

1 lens array
3 photoelectric conversion device
4 lens array main body
5 optical fiber
7 light-emitting element
8 light-receiving element
11 first lens face
12 second lens face
13 third lens face
14 total reflection surface
16 prism placement recessing section
17 reflective/transmissive layer
18 prism
20 adhesive
25 first air-bubble retention prevention recessing section
26 second air-bubble retention prevention recessing section
27 flow prevention recessing edge section

The invention claimed is:
1. A lens array that is disposed between a photoelectric conversion device and an optical transmission body, the photoelectric conversion device in which a plurality of light-emitting elements are formed in an array and at least one light-receiving element is formed that receives monitor light for monitoring light emitted from at least one of the plurality of light-emitting elements, the lens array capable of optically coupling the plurality of light-emitting elements and end faces of the optical transmission body, the lens array comprising:
  a plurality of first lens faces that are formed on a first surface of a lens array main body on the photoelectric conversion device side, to be arrayed in a predetermined array direction corresponding with the plurality of light-emitting elements and into which the light emitted from each of the plurality of light-emitting elements enters;
  a plurality of second lens faces that are formed on a second surface of the lens array main body on the optical transmission body side that is adjacent to the first surface in a direction perpendicular to the array direction, the plurality of second lens faces formed to be arrayed along the array direction and that emit the light of each of the plurality of light-emitting elements that has entered each of the plurality of first lens faces towards the end faces of the optical transmission body;
  at least one third lens face that is formed on the first surface in a position towards the second surface in relation to the plurality of first lens faces and that emits the monitor light that has entered from an inner side of the lens array main body towards the light-receiving element;
  a total reflection surface that is formed on a third surface of the lens array main body on a side opposite to the first surface, to oppose the plurality of first lens faces, and that totally reflects the light of each of the plurality of light-emitting elements that has entered the plurality of first lens faces towards the side of the plurality of second lens faces;
  a prism placement recessing section that is formed in a recessing manner on the third surface in a position that is towards the second surface side in relation to the total reflection surface and a position that opposes the third lens face, to be positioned on an optical path connecting the plurality of first lens faces and the plurality of second lens faces;
  a prism that is disposed within the prism placement recessing section and that forms an optical path for the light of each of the plurality of light-emitting elements that advances towards the side of the plurality of second lens faces;
  a reflective/transmissive layer that is disposed on an incident surface of the prism for the light of each of the plurality of light-emitting elements, the reflective/transmissive layer reflecting the light of each of the plurality of light-emitting elements that has been totally reflected by the total reflection surface towards the third lens face side at a predetermined reflection factor and transmitting the light of each of the plurality of light-emitting elements that has been totally reflected by the total reflection surface towards the incident surface side at a predetermined transmission factor, and at this time, reflecting at least the light of one of the plurality of light-emitting elements as the monitor light;
  a light-transmissive adhesive that fills a space between the prism placement recessing section and the prism and adheres the prism within the prism placement recessing section;
  a first air-bubble retention prevention recessing section that is formed in a recessing manner on the third surface to communicate with the prism placement recessing sec- tion in one array direction and to be off of the optical path of the light of each of the plurality of light-emitting elements, and that prevents retention of air-bubbles in the adhesive on the optical path of the light of each of the plurality of light-emitting elements between the prism placement recessing section and the prism during adhesion of the prism;

a second air-bubble retention prevention recessing section that is formed in a recessing manner on the third surface to communicate with the prism placement recessing section in the other array direction and to be off the optical path of the light of each of the plurality of light-emitting elements, and that prevents retention of air-bubbles in the adhesive; and an adhesive flow prevention recessing edge section that is formed in a recessing manner on the third surface to surround respective openings of the prism placement recessing section, the first air-bubble retention prevention recessing section, and the second air-bubble retention recessing section, and that prevents flow of the adhesive onto the total reflection surface during adhesion of the prism.

2. A method for manufacturing a lens array of claim 1, comprising:

providing a lens array comprising the plurality of first lens faces, the plurality of second lens faces, the at least one third lens face, the total reflection surface, the prism placement recessing section, the reflective/transmissive layer, the first air-bubble retention prevention recessing section, the second air-bubble retention prevention recessing section, and the adhesive flow prevention recessing edge section; and adhering the prism within the prism placement recessing section-via the light-transmissive adhesive filling a space between the prism placement recessing section and the prism.

3. The method for manufacturing the lens array according to claim 2, wherein:

in a state in which the prism is disposed in the prism placement recessing section, the adhesive fills the space between the prism placement recessing section and the prism while being injected from either of the first air-bubble retention prevention recessing section and the second air-bubble retention prevention recessing section and being sent to flow towards the other thereof.

4. The method for manufacturing the lens array according to claim 2, wherein:

in a state in which the adhesive is disposed in the prism placement recessing section, by the prism being disposed in the prism placement recessing section, the adhesive fills the space between the prism placement recessing section and the prism while the adhesive is sent to flow towards the first air-bubble retention prevention recessing section and the second air-bubble retention prevention recessing section.

* * * * *